(12) United States Patent
Hatakeyama et al.

(10) Patent No.: US 8,308,051 B2
(45) Date of Patent: Nov. 13, 2012

(54) METHOD OF WELDING DISSIMILAR METAL MATERIALS AND WELDED BODY OF DISSIMILAR METAL MATERIALS

(75) Inventors: Tomonobu Hatakeyama, Shizuoka-Ken (JP); Gouki Yotsuya, Shizuoka-Ken (JP)

(73) Assignee: Suzuki Motor Corporation, Hamamatsu-shi (JP)

( * ) Notice: Subject to any disclaimer, the term of this patent is extended or adjusted under 35 U.S.C. 154(b) by 0 days.

(21) Appl. No.: 13/430,315

(22) Filed: Mar. 26, 2012

(65) Prior Publication Data

US 2012/0258332 A1    Oct. 11, 2012

(51) Int. Cl.
*B23K 20/12*    (2006.01)

(52) U.S. Cl. ............... 228/112.1; 228/262.4; 228/262.5

(58) Field of Classification Search .................. None
See application file for complete search history.

(56) References Cited

U.S. PATENT DOCUMENTS

| | | | | |
|---|---|---|---|---|
| 6,045,028 | A * | 4/2000 | Martin et al. | 228/112.1 |
| 6,227,433 | B1 * | 5/2001 | Waldron et al. | 228/112.1 |
| 7,562,803 | B2 * | 7/2009 | Takase et al. | 228/112.1 |
| 7,832,615 | B2 * | 11/2010 | Gendou et al. | 228/112.1 |
| 2002/0158109 | A1 * | 10/2002 | Gendoh et al. | 228/112.1 |
| 2003/0024965 | A1 * | 2/2003 | Okamura et al. | 228/112.1 |
| 2003/0042291 | A1 * | 3/2003 | Mahoney | 228/112.1 |
| 2003/0075584 | A1 * | 4/2003 | Sarik et al. | 228/2.1 |
| 2003/0102354 | A1 * | 6/2003 | Okamura et al. | 228/112.1 |
| 2003/0201306 | A1 * | 10/2003 | McTernan et al. | 228/112.1 |
| 2004/0155094 | A1 * | 8/2004 | Okamoto et al. | 228/112.1 |
| 2004/0232209 | A1 * | 11/2004 | Stol et al. | 228/112.1 |
| 2005/0249978 | A1 * | 11/2005 | Yao | 428/699 |
| 2006/0213954 | A1 * | 9/2006 | Ruther et al. | 228/113 |
| 2007/0040006 | A1 * | 2/2007 | Charles R. et al. | 228/112.1 |
| 2007/0044406 | A1 * | 3/2007 | Van Aken et al. | 52/459 |
| 2007/0187469 | A1 * | 8/2007 | Chen et al. | 228/112.1 |
| 2008/0029581 | A1 * | 2/2008 | Kumagai et al. | 228/101 |
| 2008/0067215 | A1 * | 3/2008 | Gendou | 228/112.1 |
| 2008/0302474 | A1 * | 12/2008 | Chen et al. | 156/261 |
| 2009/0218033 | A1 * | 9/2009 | Aota et al. | 156/73.5 |
| 2010/0089977 | A1 * | 4/2010 | Chen et al. | 228/114.5 |
| 2010/0222222 | A1 * | 9/2010 | Mito et al. | 505/150 |
| 2010/0252614 | A1 * | 10/2010 | Fujii et al. | 228/112.1 |
| 2010/0288817 | A1 * | 11/2010 | Yao | 228/2.1 |
| 2012/0052322 | A1 * | 3/2012 | Hatakeyama et al. | 428/650 |

FOREIGN PATENT DOCUMENTS

| | | | |
|---|---|---|---|
| JP | 2003-225778 A | * | 8/2003 |
| JP | 2005034879 | | 2/2005 |
| JP | 2006239720 | | 9/2006 |
| JP | 2007-253172 A | * | 10/2007 |

* cited by examiner

*Primary Examiner* — Kiley Stoner
(74) *Attorney, Agent, or Firm* — Barnes & Thornburg LLP

(57) ABSTRACT

A method of welding dissimilar metal materials, wherein a high melting-point material and a low melting-point material which are dissimilar metal materials having melting points different from each other are positioned to a planned welding position, and a rotatable tool is pressed to and then inserted into the high melting-point material to thereby perform a friction-stir-welding between the high melting-point material and the low melting-point material to each other. The friction-stir-welding between the high melting-point material and the low melting-point material is performed by disposing an intervening piece made from a same material as the high melting-point material between the rotatable tool and the high melting-point material.

4 Claims, 4 Drawing Sheets

TABLE 1
PRESENCE OR ABSENCE OF ADHESION PREVENTION EFFECT
BY CHANGING DIMENSION OF INTERVENING PIECE

| DIMENSION OF INTERVENING PIECE | 1.0mm (17%) | 1.5mm (25%) | 2.0mm (33%) | 4.0mm (67%) | 6.0mm (100%) | 8.0mm (133%) | 10mm (167%) | 15mm (250%) |
|---|---|---|---|---|---|---|---|---|
| PRESENCE OR ABSENCE OF ADHESION | PRESENCE | ABSENCE | ABSENCE | ABSENCE | ABSENCE | ABSENCE | ABSENCE | ABSENCE |

※ % IN ( ) SHOWS RATIO WITH RESPECT TO DIAMETER (Φmm) OF ROTATABLE TOOL

TABLE 2
PRESENCE OR ABSENCE OF ADHESION PREVENTION EFFECT
BY CHANGING PLATE THICKNESS OF INTERVENING PIECE

| PLATE THICKNESS OF INTERVENING PIECE | 0.1mm | 0.2mm | 0.5mm | 1.0mm | 1.2mm | 1.4mm | 1.6mm | 2.0mm |
|---|---|---|---|---|---|---|---|---|
| PRESENCE OR ABSENCE OF ADHESION | PRESENCE | ABSENCE | ABSENCE | ABSENCE | ABSENCE | ABSENCE | ABSENCE | ABSENCE |

TABLE 3
PRESENCE OR ABSENCE OF ADHESION PREVENTION EFFECT
BY CHANGING SHAPE OF INTERVENING PIECE

| SHAPE OF INTERVENING PIECE | QUADRANGLE | CIRCLE | TRIANGLE |
|---|---|---|---|
| PRESENCE OR ABSENCE OF ADHESION | ABSENCE | ABSENCE | ABSENCE |

FIG. 6

METHOD OF WELDING DISSIMILAR METAL MATERIALS AND WELDED BODY OF DISSIMILAR METAL MATERIALS

PRIORITY CLAIM

This patent application claims priority to Japanese Patent Application No. 2011-083969, filed Apr. 5, 2011, the disclosure of which is incorporated herein by reference in its entirety.

BACKGROUND

1. Field

The present invention relates to a method of welding dissimilar metal materials by a friction stir welding method, and a welded body of dissimilar metal materials obtained by such welding method.

2. Related Art

Dissimilar metal materials, particularly, such as a steel material and an aluminum material, are generally welded by a melt welding method or mechanical bonding method such as using a rivet.

However, in the melt welding method, since the heat input amount is large there causes such a problem as that a brittle intermetallic compound ($Fe_2Al_5$, $FeAl_3$ and the like) is formed in a boundary between the steel material and the aluminum material, resulting in lowering in the welding strength. In addition, in the mechanical welding method using rivets, bolts or the like, an additional member or material such as a rivet is needed for the welding, which results in increased cost.

For this reason, in recent years, research has been progressed for welding a steel material and an aluminum material to each other by a friction stir welding method (FSW: Friction Stir Welding) in which materials to be welded are softened without melt-welding the materials to thereby fluidize the softened materials and weld the materials to each other in a solid state. This friction stir welding method uses an FSW tool which is manufactured from a general tool steel, and brings the FSW tool into contact with only the aluminum material to perform the friction-stir-welding between the steel material and the aluminum material (see, for example, Patent Document 1: Japanese Patent Application Laid-Open Publication No. 2005-34879; Patent Document 2: Japanese Patent Application Laid-Open Publication No. 2006-239720).

For example, in the friction stir welding method described in Patent Document 1, a steel material of which the surface to be welded is covered with an antioxidant film (plated Zn film) and an aluminum material is overlapped with each other, the FSW tool is pressed to and inserted into the aluminum material while rotating the same, softening the aluminum material and the plated Zn film are then softened by applying a frictional heat to plastically fluidize the softened materials, the Zn film is removed to expose a newly-formed surface on the surface of the steel material, and the plastically fluidized aluminum material and the newly-formed surface of the steel material are finally welded to each other to realize a solid-state welding.

However, in the friction stir welding method performed without contacting the FSW tool to the steel material but only contacting to the aluminum material, the steel material and the aluminum material are not sufficiently stirred, and accordingly a high welding strength cannot be obtained. In other words, in a case where the FSW tool is brought into contact with the aluminum material and is inserted thereinto, when the temperature of the aluminum material rises to a temperature just below the melting point thereof, the aluminum material is softened and plastically fluidized to lower the friction strength with respect to the FSW tool. Therefore, the heat (frictional heat) is not generated any more, and the temperature cannot be raised to a temperature at which the steel material can be plastically fluidized, and thus, only the aluminum material is stirred, and the steel material and the aluminum material cannot be sufficiently stirred, and it becomes difficult to obtain a high bonding strength.

Furthermore, in a case where the FSW tool manufactured from a general tool steel is brought into contact with the steel material while being rotated in accordance with a conventional technique, the FSW tool may be worn or damaged by the adhesion of the steel material to the FSW tool.

SUMMARY

The present invention was therefore conceived in consideration of the circumstances mentioned above in connection with conventional art, and an object of the present invention is to provide a method of welding dissimilar metal materials capable of welding dissimilar metal materials to each other with a high welding strength and avoiding the damaging of a rotatable (rotating) tool for friction stir welding, and also to provide a welded body of the dissimilar metal materials formed by the welding method disclosed above.

This and other objects can be achieved according to the present invention by providing a method of welding dissimilar metal materials, in the method, a high melting-point material and a low melting-point material, which are dissimilar metal materials having melting points different from each other, are positioned to a planned welding position, and a rotatable tool is pressed to and then inserted into the high melting-point material to thereby perform a friction-stir-welding between the high melting-point material and the low melting-point material to each other. In the above method, the friction-stir-welding between the high melting-point material and the low melting-point material is performed by disposing an intervening piece made from a same material as the high melting-point material between the rotatable tool and the high melting-point material.

A welded body of the dissimilar metal materials according to the present invention is a body formed of the high melting-point material and the low melting-point material which are welded to each other using the above described method of welding the dissimilar metal materials.

According to another disclosed embodiment of the method of welding the dissimilar metal materials and the welded body of the dissimilar metal materials of the present invention, the high melting-point material and the low melting-point material are friction-stir-welded to each other by arranging the intervening piece made from the same material as the high melting-point material between the rotatable tool and the high melting-point material, so that the rotatable tool does not directly come into contact with the high melting-point material in the welding method. Accordingly, the high melting-point material can be prevented from adhering to the rotatable tool, and the damaging of the rotatable tool for the friction stir welding can be avoided.

In one disclosed embodiment of the method of welding the dissimilar metal materials, the rotatable tool is inserted from the high melting-point material side, so that the high melting-point material generates heat up to a temperature at which the high melting-point material is softened and plastically fluidized, and the generated heat is transferred to the low melting-point material to also soften and plastically fluidize the low melting-point material. Accordingly, the high melting-point material and the low melting-point material can be partially and sufficiently stirred by the rotatable tool, thus these materials being welded to each other with at a high welding strength.

The nature and further characteristic features of the present invention will be made clearer from the following descriptions made with reference to the accompanying drawings.

BRIEF DESCRIPTION OF THE DRAWINGS

In the accompanying drawings:

FIG. 1 is a view illustrating an embodying situation of a friction stir welding method to which one disclosed embodiment of a method of welding dissimilar metal materials according to the present invention is applied, in which

FIG. 5 shows an appearance of a rotatable tool after the friction stir welding, in which FIG. 6 includes tables representing a relationship between the intervening piece and an adhesion-preventing effect, in which Table 1 represents a relationship between a dimensional change of the intervening piece and the presence or absence of an adhesion-preventing effect, Table 2 represents a relationship between the change of the plate thickness of the intervening piece and the presence or the absence of the adhesion-preventing effect, and Table 3 represents a relationship between the change of the shape of the intervening piece and the presence or the absence of the adhesion-preventing effect.

DESCRIPTION OF THE DISCLOSED EMBODIMENTS

Hereunder, the disclosed embodiments of the present invention will be described with reference to the accompanying drawings. It is to be noted that the present invention is not limited to the disclosed embodiments.

Figure 1A:
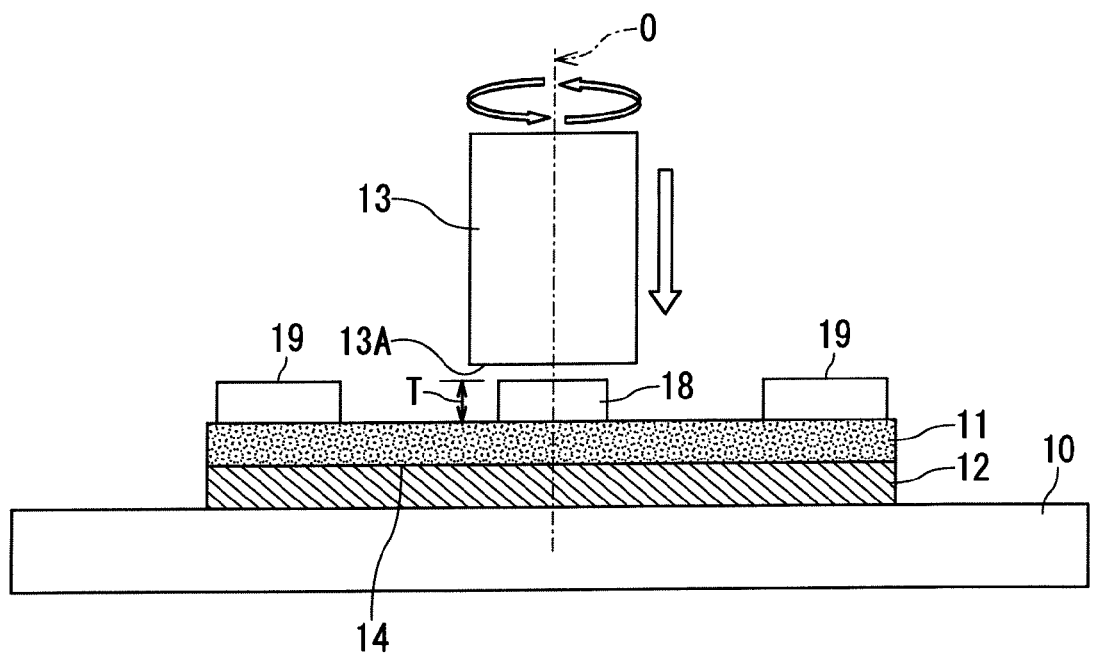
FIG. 1A is a schematic side view thereof and FIG. 1B is a schematic plan view thereof.

FIG. 1 represents a state of arrangement for embodying (implementing) a friction stir welding method to which one disclosed embodiment of a method of welding dissimilar metal materials of the present invention is applicable.

The friction stir welding method of the present embodiment is a method conducted by overlapping and spot-welding dissimilar metal materials having melting points different from each other (high melting-point material and low melting-point material) with each other by using a rotatable (rotating) tool 13 for friction stir welding.

An iron material, particularly, a steel material 11 having a melting point of approximately 1,500° C. is used as the high melting-point material, and an aluminum material (including aluminum alloy) 12 having a melting point of approximately 580° C. to 650° C. is used as the low melting-point material.

Here, the aluminum material 12 is not limited to a wrought (expanded) material such as A6061, but may also be a cast material such as AC4CH, and a die-cast material such as ADC12.

In the friction stir welding method of the present embodiment, firstly, the steel material 11 and the aluminum material 12 are overlapped with each other, and are positioned at a predetermined planned welding position. At this time, the steel material 11 is positioned on the upper side, and the aluminum material 12 is positioned on the lower side, respectively, as shown in FIG. 1, so that the aluminum material 12 is mounted on a weld backing jig 10.

Furthermore, an intervening (which may be replaced with "intervened" as occasion demands) piece 18 is mounted on the upper surface of the steel material 11. The intervening piece 18 is thus arranged between a rotatable tool 13 and the steel material 11 in a post-process. In addition, the intervening piece 18 is made from an iron having the same material components as that of the steel material 11, but is optionally made from a steel having the same material components as that of the steel material 11.

Figure 1B:
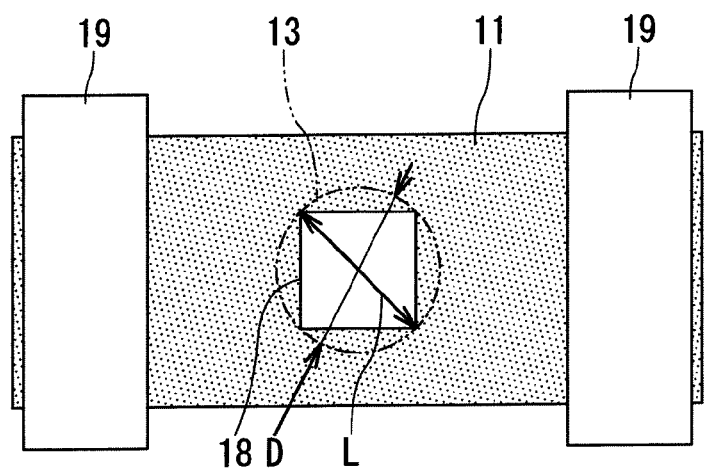

The intervening piece 18 may have any shape such as a square shape, a rectangular shape, a triangular shape or a circular shape when viewed from the front, as is illustrated in FIG. 1B, but a length L of the longest portion thereof is set at 25% or more with respect to a diameter D of a circle-shaped contact surface 13A at the head of the rotatable tool 13, and optionally, is set in a range of 25% to 300%.

When the intervening piece 18 has a square shape or a rectangular shape, for instance, the length L of the longest portion of the intervening piece 18 is a length of a diagonal line, and when the intervening piece 18 has a circular shape, the length L is a diameter. Furthermore, the plate thickness T of the intervening piece 18 is set at 0.2 mm or more, and optionally, is set in a range of 0.2 mm to 3.0 mm.

Next, a fixing jig 19 holds the steel material 11 and the aluminum material 12 at a fixed state, by sandwiching the materials between the weld backing jig 10 and the fixing jig 19. At this time, the intervening piece 18 is held in a non-fixed state. Under the states, the steel material 11 and the aluminum material 12 are friction-stir-spot-welded with the use of the rotatable tool 13.

This friction stir spot welding method includes steps of moving the rotatable tool 13 from the steel material 11 side along an axis O direction (axial direction O) while rotating the rotatable tool 13, pressing the contact surface 13A of the rotatable tool 13 to the intervening piece 18, squashing the intervening piece 18 while rotating the intervening piece 18 together with the rotatable tool 13, and then pressing the rotatable tool 13 and the intervening piece 18 against and inserting the rotatable tool 13 and the intervening piece 18 into the steel material 11, while rotating the rotatable tool 13 and the intervening piece 18.

In the processes mentioned above, the steel material 11 and the aluminum material 12 are friction-stir-spot-welded to each other in such a state that the intervening piece 18 is interposed between the steel material 11 and the rotatable tool 13 so as to prevent the steel material 11 and the rotatable tool 13 from directly coming in contact with each other, and the steel material 11 is thus prevented from adhering to the rotatable tool 13 after the welding process. In addition, in the above described friction stir spot welding, the intervening piece 18 is set in a non-fixed state, and hence, the intervening piece 18 rotates together with the rotatable tool 13, thereby preventing the generation of frictional heat between the rotatable tool 13 and the intervening piece 18, and hence, preventing the intervening piece 18 from being welded (inclusive of adhesion, deposition or the like) to the rotatable tool 13.

Herein, the rotatable tool 13 is made from a tool steel such as SKD61 and a die-steel, and is formed into a round bar having a diameter of 3 mm to 10 mm. In addition, the revolution number of the rotatable tool 13 is set at 75 rpm to 750 rpm. Furthermore, a position of the rotatable tool 13 which is to be inserted into the steel material 11 is adjusted to a position at which the steel material 11 cannot be broken through by the tool 13. Specifically, this insertion position of the rotatable tool 13 is adjusted to a position at which a contact surface 13A of the tip of the rotatable tool 13 is apart by a predetermined distance apart (for instance, 0.05 mm to 0.6 mm) from an overlapped surface 14 between the steel material 11 and the aluminum material 12, toward the steel material 11.

The friction stir spot welding method as described above may partially raise the temperature of the steel material 11 at a portion in the vicinity of the rotatable tool 13 by heat generated by the friction between the intervening piece 18 rotating together with the rotatable tool 13 and the steel material 11, and softens and plastically fluidizes the steel material 11 together with the intervening piece 18. In addition, the friction stir welding method may also partially raise the temperature of the aluminum material 12 at a portion in the vicinity of the rotatable tool 13 by the heat generated by the above described friction, and softens and plastically fluidizes the aluminum material 12. The steel material 11 and the aluminum material 12 are then stirred at a portion in the vicinity of the rotatable tool 13, which have been plastically fluidized, by the rotation of the rotatable tool 13 together with the intervening piece 18, and the steel material 11 and the aluminum material 12 are subjected to the friction-stir-spot welding to each other.

Figure 2:
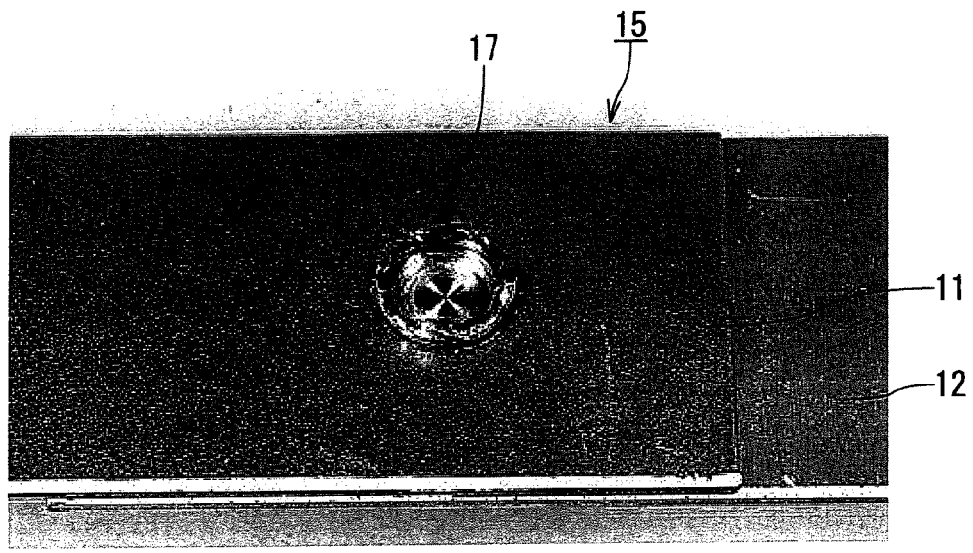
FIG. 2 shows an outer appearance of a welded portion of a friction stir welded body obtained by the friction stir welding method in FIG. 1.
Figure 3:
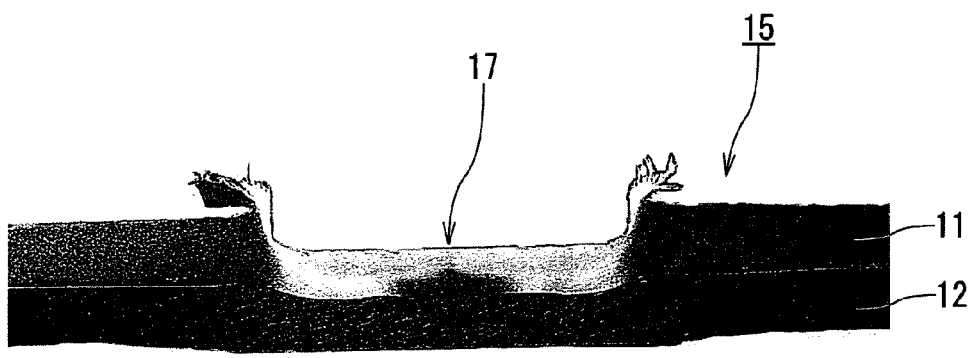
FIG. 3 is a sectional view of FIG. 2 showing a periphery of the welded portion.

A friction stir welded body 15 shown in FIG. 2 and FIG. 3 is a welded body of dissimilar metal materials obtained by the friction stir spot welding method mentioned above including the steps of: overlapping the steel material 11 which is a bare soft steel plate (JSC270CC:J.I.S.) having a plate thickness of 1 mm and the aluminum material 12 which is an A6061 aluminum wrought plate having a plate thickness of 1 mm; mounting the quadrangle-shaped intervening piece 18 made of a bare soft steel plate (JSC27OCC) and having a length L of a diagonal line of 6 mm and a plate thickness T of 1.0 mm, on the upper surface of the bare soft steel plate which is the steel material 11; and friction-stir-spot-welding the steel material 11 (bare soft steel plate) and the aluminum material 12 (aluminum wrought plate) to each other under the following welding conditions.

The welding conditions are as follows.

The round-bar shaped rotatable (rotating) tool 13 is prepared, and the rotatable tool 13 is made from SKD61 and has a diameter 6 mm. The revolution number of the rotatable tool 13 is 500 rpm. The insertion speed of the rotatable tool 13 is 20 mm/min, and the rotatable tool 13 is inserted into the steel material 11 to a position at which a contact surface 13A of the tip of the rotatable tool 13 is apart by 0.5 mm from a matching surface 14 of the steel material 11 and the aluminum material 12 toward the steel material 11 side. A holding time between the time when the insertion of the rotatable tool 13 has been finished and the time when the rotatable tool 13 is pulled out is 1 second.

Figure 4:
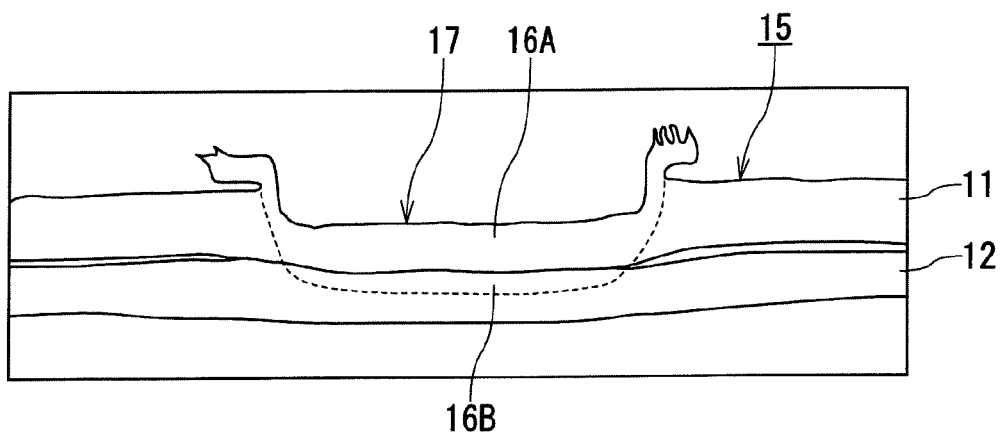
FIG. 4 is a sectional view schematically illustrating FIG. 3.

In this friction stir welded body 15, a welded portion 17 is formed by a stirred portion 16A in the steel material 11 (bare soft steel plate) side and a stirred portion 16B in the aluminum material 12 (aluminum wrought plate) side, which have been welded by the rotatable tool 13 as shown in FIG. 4.

Figure 5A:
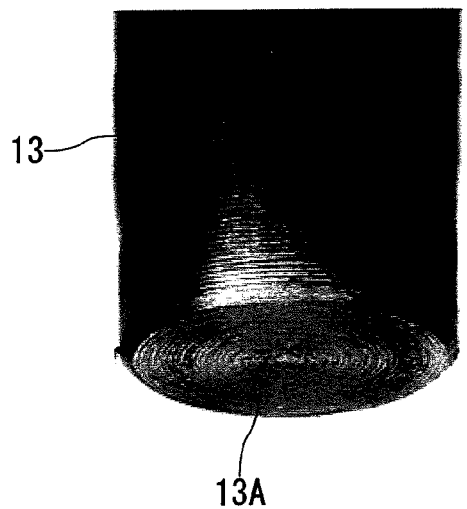
FIG. 5A shows an appearance after the friction stir welding method drawn in FIG. 1 has been conducted, and FIG. 5 B shows an appearance after the friction stir welding method has been conducted without using an intervening piece.
Figure 5B:
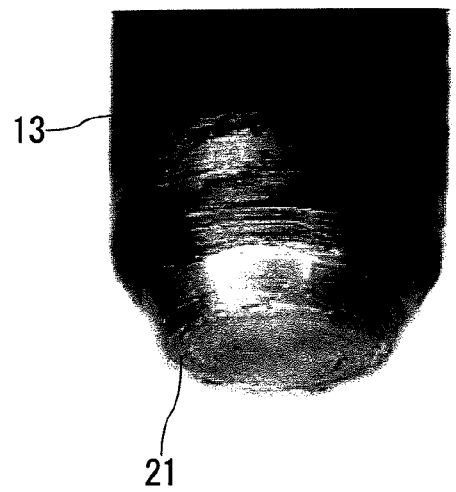

FIG. 5A shows the outer appearance of the periphery of the contact surface 13A of the rotatable tool 13 after having finished the friction stir spot welding mentioned above, and FIG. 5B shows the outer appearance of the periphery of the contact surface 13A of the rotatable tool 13 after the steel material 11 (bare soft steel plate; plate thickness 1 mm) and the aluminum material 12 (aluminum wrought plate; plate thickness 1 mm) have been friction-stir-spot-welded without interposing the intervening piece 18, under the same welding condition as that in the above described friction stir spot welding. With reference to FIG. 5B, a part of the steel material 11 adheres to the periphery of the contact surface 13A of the rotatable tool 13 as an adhering substance 21, whereas the adhering substance 21 is not observed in the rotatable tool 13 which has finished the friction stir spot welding with the intervening piece 18 being interposed as shown in FIG. 5A.

In the friction stir spot welding method shown in FIG. 1, the dimension (in other words, length L of longest portion) of the intervening piece 18 is set at 25% or more with respect to the diameter D of the contact surface 13A of the rotatable tool 13 and may be set in a range of 25% to 300%. This is because the steel material 11 is thereby prevented from adhering to the rotatable tool 13 in the welding process by controlling a direct contact area between the rotatable tool 13 and the steel material 11 so as not to be large.

For instance, a friction stir spot welding test was conducted under the above described welding conditions by overlapping the steel material 11 of the bare soft steel plate having the plate thickness of 1 mm and the aluminum material 12 of the A6061 aluminum wrought plate having the plate thickness of 1 mm and by changing the dimension (length L of longest portion) of the square-shaped intervening piece 18 having the plate thickness T of 1.0 mm. At this time, it was observed whether the adhering substance 21 which adhered to the periphery of the contact surface 13A of the rotatable tool 13, was present or not. The result is shown in Table 1 of FIG. 6.

As shown in the Table 1 of FIG. 6, when the intervening piece 18 was used that has the length L of the diagonal line of 1.0 mm, which is the longest portion of the intervening piece 18, (in other words, approximately 17% length with respect to diameter D of contact surface 13A of rotatable tool 13), the adhesion of the steel material 11 was observed on the rotatable tool 13 after having finished the welding. This is because the direct contact area of the steel material 11 and the rotatable tool 13 became large as the intervening piece 18 became small. On the other hand, in the case where the intervening piece 18 was used that has the length L of the diagonal line of 1.5 mm or more, which is the longest portion of the intervening piece 18, (in other words, 25% length with respect to diameter D of contact surface 13A of rotatable tool 13), the adhesion of the steel material 11 was not observed on the rotatable tool 13 after having finished the welding.

Furthermore, the reason why the plate thickness T of the intervening piece 18 has been set at 0.2 mm or more and optionally has been set in a range of 0.2 mm to 3.0 mm in the friction stir spot welding method shown in FIG. 1 resides in that the direct contact between the rotatable tool 13 and the steel material 11 is prevented without breaking the intervening piece 18 by the rotation of the rotatable tool 13 in the welding process, and the adhesion of the steel material 11 to the rotatable tool 13 is thereby prevented.

For instance, in an experiment, a friction stir spot welding test was conducted under the above described welding conditions, by overlapping the steel material 11 which is the bare soft steel plate having the plate thickness of 1 mm and the aluminum material 12 which is the A6061 aluminum wrought (expanded) plate having the plate thickness of 1 mm, with each other, and changing the plate thickness T of the square-shaped intervening piece 18 having the length L of the diagonal line of 6 mm. At that time, it was observed whether the adhering substance was adhered to the periphery of the contact surface 13A of the rotatable tool 13. The result is shown in Table 2 of FIG. 6.

As represented in the Table 2 of FIG. 6, when the intervening piece 18 having the plate thickness T of 0.1 mm or less was used, the adhesion of the steel material 11 was observed on the rotatable tool 13 after having finished the welding. This is because as the plate thickness of the intervening piece 18 becomes thin, the intervening piece 18 was broken in the welding process, and the rotatable tool 13 and the steel material 11 is directly contacted with each other.

On the other hand, in the case where the intervening piece 18 having the plate thickness T of 0.2 mm or more was used, the adhesion of the steel material 11 was not observed on the rotatable tool 13 after having finished the welding.

Furthermore, a friction stir spot welding test was conducted under the above described welding conditions, by overlapping the steel material 11 which is the bare soft steel plate having the plate thickness of 1 mm and the aluminum material 12 which was the A6061 aluminum wrought plate having the plate thickness of 1 mm, and using the intervening pieces 18 each having a shape of a square shape, a circle shape or a (equilateral) triangle shape, in the friction stir spot welding method illustrated in FIG. 1. At this time, it was observed whether the adhering substance is adhered to the periphery of the contact surface 13A of the rotatable tool 13, or not. The result is shown in the Table 3 of FIG. 6C.

As represented in the Table 3 of FIG. 6, even if the intervening piece 18 has any shape, the adhesion of the steel material 11 was not observed in the periphery of the contact surface 13A of the rotatable tool 13 after having finished the welding. Each of the used intervening pieces 18 had the length L of the longest portion (in the case of the square shape, L was the diagonal line, in the case of the circle shape, L was the diameter, and in the case of the equilateral triangle shape, L was one side) of 6 mm, and the plate thickness T was 1.0 mm.

According to the present embodiment of the characters and features described above, the following advantageous effects and/or functions (1) to (5) can be achieved.

In the embodiment, an intervening piece 18 (e.g., steel) made from the same material as the steel material 11 is arranged between the rotatable tool 13 and the steel material 11, and the friction-stir-spot-welding is performed between the steel material 11 and the aluminum material 12. Accordingly, the rotatable tool 13 and the steel material 11 do not directly come in contact with each other during the welding operation. Accordingly, the steel material 11 can be prevented from adhering to the rotatable tool 13, and accordingly, the damaging of the rotatable tool 13 for friction stir welding can be obviated.

In the method of the present embodiment, the steel material 11 generates heat up to a temperature at which the steel material is softened and plastically fluidized by inserting the rotatable tool 13 from the steel material 11 side so as to soften and plastically fluidize the aluminum material 12 by the heat transfer of the generated heat. Accordingly, the steel material 11 and the aluminum material 12 can be partially and sufficiently stirred by the rotatable tool 13, and the steel material 11 and the aluminum material 12 can be welded to each other with a high welding strength.

Since the steel material 11 and the aluminum material 12 are arranged at a fixed state by sandwiching the materials with a welding backing jig 10 and a fixation jig 19, the intervening piece 18 is disposed at a non-fixed state, and in this state, the friction-stir-spot-welding is performed to the materials to each other. Accordingly, when the contact surface 13A of the rotatable tool 13 comes in contact with the intervening piece 18, the intervening piece 18 is rotated together with the rotatable tool 13. Thus, the frictional heat is not generated between the rotatable tool 13 and the intervening piece 18, and hence, the intervening piece 18 can be prevented from being welded (adhering, depositing or the like) to the rotatable tool 13.

The method includes setting the dimension of the intervening piece 18, in other words, the length L of the longest portion of the intervening piece 18 at 25% or more with respect to the diameter D of the contact surface 13A of the rotatable tool 13. Thereby, the direct contact area between the rotatable tool 13 and the steel material 11 can be lowered in the friction stir spot welding process. As a result, the adhesion of the steel material 11 to the rotatable tool 13 can be prevented.

Since the plate thickness T of the intervening piece 18 is set to 0.2 mm or more, even when the rotatable tool 13 is contacted to the intervening piece 18 in the friction stir spot welding process, the intervening piece 18 can be prevented from being broken by the rotation of the rotatable tool 13. Accordingly, the rotatable tool 13 does not directly come into contact with the steel material 11, and the adhesion of the steel material 11 to the rotatable tool 13 can be prevented.

It is further to be noted that although the present invention has been described hereinbefore with reference to the disclosed embodiments, the present invention is not limited to the disclosed embodiments, and many other changes and modifications or alternations may be made without departing from the scopes of the appended claims.

For example, in the disclosed embodiments, although an aluminum material is used as the low melting-point material, the material may also be a magnesium material including a magnesium alloy.

What is claimed is:
1. A method of welding dissimilar metal materials, comprising:
    preparing a rotatable tool;
    positioning a high melting-point material and a low melting-point material which are dissimilar metal materials having melting points different from each other to a planned welding position;
    pressing the rotatable tool to the high melting-point material and then inserting the rotatable tool thereinto while rotating the rotatable tool; and
    performing a friction-stir-welding between the high melting-point material and the low melting-point material to each other,
    wherein the friction-stir-welding between the high melting-point material and the low melting-point material is performed by disposing an intervening piece made from a same material as the high melting-point material between the rotatable tool and the high melting-point material, and
    wherein the high melting-point material and the intervening piece are an iron material, and the low melting-point material is either one of an aluminum material or a magnesium material.
2. The method of claim 1, wherein the friction-stir-welding is performed by setting the high melting-point material and the low melting-point material in a fixed state, and setting the intervening piece in a non-fixed state.

3. The method of claim 1, wherein the intervening piece has a length of a longest portion in dimension set at 25% or more with respect to a diameter of a circle-shaped contact surface of the rotatable tool.

4. The method of claim 1, wherein the intervening piece has a plate thickness set at 0.2 mm or more.

* * * * *